(12) United States Patent
Belanger

(10) Patent No.: US 8,550,098 B2
(45) Date of Patent: *Oct. 8, 2013

(54) TOUCHLESS CAR WASH SYSTEM

(71) Applicant: Belanger, Inc., Northville, MI (US)

(72) Inventor: Michael J. Belanger, Northville, MI (US)

(73) Assignee: Belanger, Inc., Northville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/866,180

(22) Filed: Apr. 19, 2013

(65) Prior Publication Data

US 2013/0228201 A1   Sep. 5, 2013

Related U.S. Application Data

(60) Division of application No. 13/025,503, filed on Feb. 11, 2011, now Pat. No. 8,443,818, which is a continuation-in-part of application No. 12/707,777, filed on Feb. 18, 2010.

(60) Provisional application No. 61/333,480, filed on May 11, 2010.

(51) Int. Cl.
    *B08B 3/04* (2006.01)

(52) U.S. Cl.
    USPC ............... 134/123; 134/32; 134/34; 134/113; 134/198

(58) Field of Classification Search
    None
    See application file for complete search history.

(56) References Cited

U.S. PATENT DOCUMENTS 7,438,075 B1 * 10/2008 Huntington et al. ........ 134/57 R

* cited by examiner

*Primary Examiner* — Michael Kornakov
*Assistant Examiner* — Ryan Coleman
(74) *Attorney, Agent, or Firm* — Young Basile Hanlon & MacFarlane PC

(57) ABSTRACT

A carwash system is disclosed wherein a spray arm dependingly mounted to an overhead longitudinally movable carriage for dispensing fluids onto the exterior surfaces of a vehicle in a wash bay unidirectionally circumnavigates the vehicle for multiple circuits while performing one or more wash functions by coordinating longitudinal and rotational movements of the arm through the selective operation of two independent motor drives. Electrical power and/or data is carried to and from electrical devices on the arm by way of a slip ring conductor which is mounted coaxially with the arm pivot on the bottom side of the carriage. The fluid supply conduit also passes concentrically through this pivot.

4 Claims, 8 Drawing Sheets

TOUCHLESS CAR WASH SYSTEM

RELATED APPLICATIONS

This application is a divisional of U.S. patent application Ser. No. 13/025,503, which application is a continuation-in-part of U.S. application Ser. No. 12/707,777 filed Feb. 18, 2010, currently pending and U.S. Provisional Application Ser. No. 61/333,480 filed May 11, 2010. The content of the U.S. patent application Ser. Nos. 13/025,503, 12/707,777 and 61/333,480 are incorporated herein by reference.

FIELD OF THE INVENTION

This invention relates to a touchless carwash system of the type having a spray arm which moves around a vehicle in a wash area to perform one or more wash functions.

BACKGROUND OF THE INVENTION

It is known to perform a carwash procedure by means of a spray arm capable of moving relative to a vehicle while dispensing various fluids in a programmed fashion; see, for example, U.S. Pat. No. Re 40,463 reissued Aug. 26, 2008 and assigned to Belanger, Inc. of Northville, Mich. That reissued patent describes both single arm and multiple arm systems. In both forms, three degrees of motion; i.e., longitudinal displacement, lateral displacement and rotation.

As used herein, the terms "car" and "vehicle" are used interchangeably to refer to all types of vehicles including passenger cars, SUVs, trucks, busses, etc. The terms "carwash" and "laundering" are used generically to refer to vehicle treatment procedures which may include simple wash sequences or more complex, multiple functions such as pre-soak, wash, rinse, rustproof, wax, and air-dry.

SUMMARY OF THE INVENTION

In accordance with a first aspect of the present invention, a spray arm carrying one or more electrical devices and depending from an overhead support such as a carriage can circumnavigate a vehicle while providing fluids to the arm. In addition, an electrical signal path from one or more carriage-borne conductors to one or more arm-borne electrical devices is provided in such a way as to allow essentially unlimited rotation of the arm. In general, this is accomplished by providing one or more electrical power and/or data circuits from an off-arm conductor to the electrical device or devices on the arm through a rotation-tolerant connection such as a slip ring conductor. The arm may, if desired, rotate around the vehicle in the same direction for multiple or even unlimited rotation, not only throughout the entirety of a wash program but from one vehicle wash program to the next.

In accordance with another aspect of the invention, a method of operating a carwash system of the type including an overhead carriage supporting a pivotable depending spray arm having fluid-dispensing nozzles thereon is provided whereby the spray arm is caused to circumnavigate a vehicle for multiple rotations while performing one or more wash functions.

In general, the method is enabled while providing just two axes of controlled movement; i.e., a longitudinal movement via a rail-mounted overhead carriage, and a rotational movement brought about by a powered pivot, all acting under the direction of a controller for coordinating the two axes of movement and, if necessary, matching the movements to the dimensions of the vehicle being washed. Thus the expense and complexity of providing a lateral movement capability is avoided.

By virtue of the system described above, a spray arm of the type which is dependingly pivotally mounted to a longitudinally-movable overhead carriage can be caused to circumnavigate a vehicle in such a way as to maintain a desired distance from the vehicle not only at the corners and along the major sides thereof, but along the front and rear surfaces of the vehicle during the circumnavigation of the vehicle regardless of its length with only two axes of allowable movement. The control system which coordinates the operation of the longitudinal and rotational drive systems produces a size-matched path of travel around the vehicle which is essentially rectangular rather than assuming a shape which is bowed at the opposite ends.

Various additional features and advantages of the present invention will be appreciated from a reading of the following specification which is to be taken with the accompanying drawings.

BRIEF SUMMARY OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENT

Figure 1:
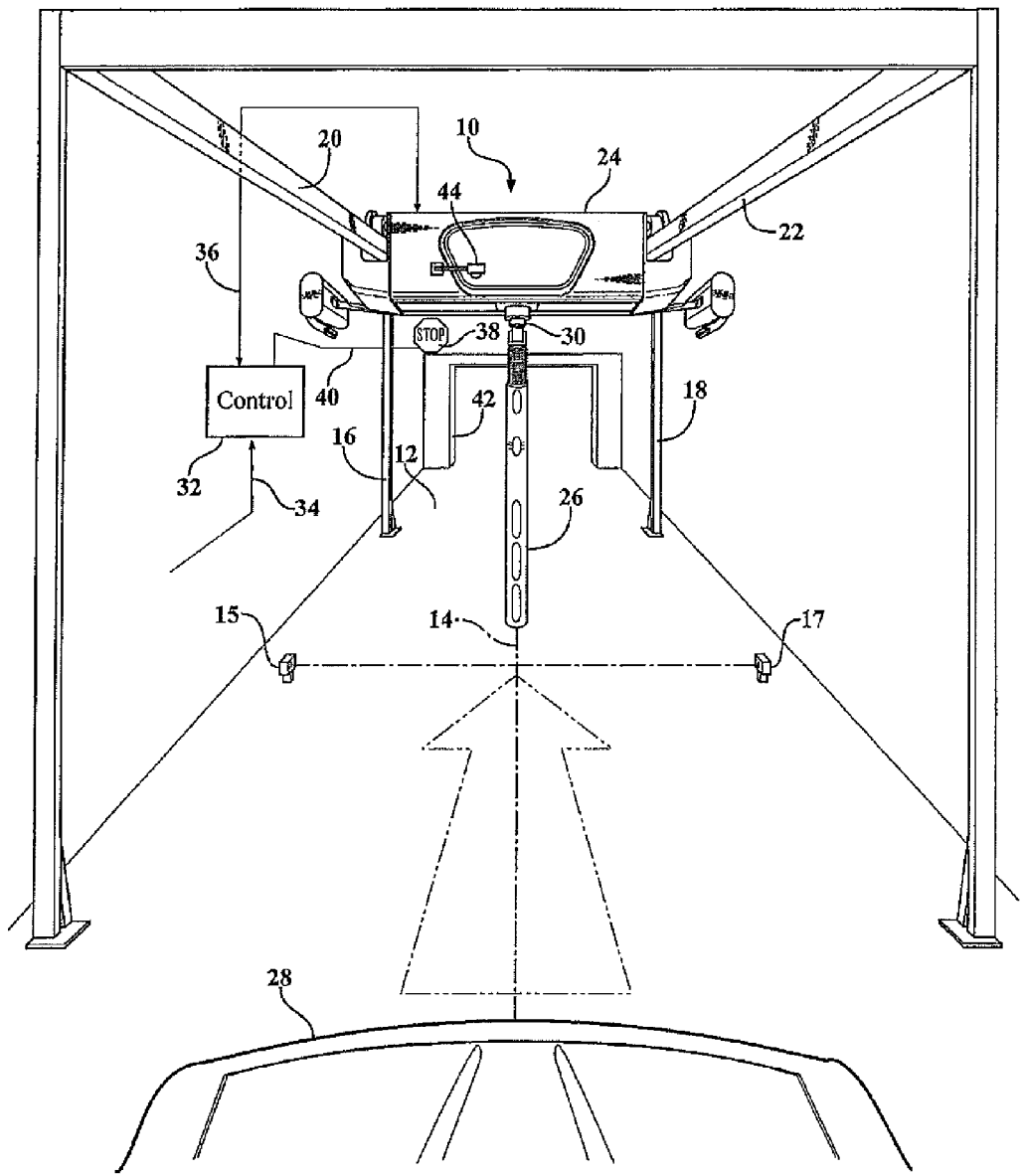
FIG. 1 is a perspective view of a touchless automatic car wash system in an enclosed car wash bay from the standpoint of the driver of a vehicle entering the bay.

Referring to FIG. 1 there is shown from the perspective of the driver of a vehicle 28 a car wash system 10 of the touchless automatic type operationally mounted within an enclosed bay 12 wherein the apparatus 10 is essentially symmetrically arranged with respect to a longitudinal centerline 14 of the bay enclosure. It will be understood that the illustration of an enclosed bay is exemplary only as it is common to construct essentially open structures in warmer climates as well as to mount a car wash system such as system 10 in a partially defined or essentially undefined area of a larger building. Therefore, references in this document to the "centerline of the bay" are references to the operational centerline of the area traversed by dispensing component or components which travel around a vehicle, and do not necessarily denote the geographical center of the building structure or walls within which the dispensing components are installed. In other words the vehicle is to be centered relative to an equipment travel envelope rather than the building structure in which the equipment is installed, unless they are the same.

The system 10 comprises a number of laterally spaced-apart upright metal supports 16, 18 supporting an overhead railway consisting of spaced-apart parallel and longitudinally extending rails 20, 22. The supports 16, 18 are far enough apart laterally to accommodate vehicles of the type to be washed therebetween with adequate clearance for equipment. A carriage 24 is mounted on the railway 20, 22 and is equipped as hereinafter described for controlled and selective longitudinal movement along the railway during various phases of operation. The carriage may be decorated and lighted as desired.

The carriage 24 carries in depending relationship thereto an inverted L-shaped spray arm 26 which, in FIG. 1, has been caused to assume a "target position" essentially on the bay centerline 14 where it can be readily seen by the driver of a vehicle 28 during entry into the bay 12. In FIG. 1, the carriage 24 is positioned toward the far or exit end of the bay 12, the actual exit being defined in this case by an open doorway structure 42. The arm 26 is mounted to the carriage 24 by means of a complex pivot structure 30, details of which will be described with reference to FIGS. 2-4. At this point, suffice it to say that the pivot structure 30 allows the arm 26 to rotate about a vertical pivot axis which, in this case, is orthogonal to and intersecting the centerline 14. The pivot 30 is fixed laterally.

Longitudinal travel of the carriage 24 is carried out under the control of a program resident in memory in a conventional microprocessor control computer 32. The control computer 32 receives inputs on line 34 from a coin receiver or the like and on bus 36 from various sensors, including a sensor 44 carried by the carriage 24 and components mounted thereto as hereinafter explained. Control 32 is preferably a programmable, general purpose computer but may also comprise various conventional electronic components such as relays, microswitches and circuit breakers.

A system for supplying washing and rinsing fluids to the carriage 24 from a chemical storage and mixing facility is also be provided but because it is well known and conventional in nature, will not be described here. A suitable distribution boom bringing fluids and power to carriage 24 is provided to accommodate longitudinal travel of the carriage as shown in the co-pending application Ser. No. 13/025,466, filed concurrently herewith. Control computer 32 not only receives signals from sensors associated with the carriage 24 but also sends signals by way of bus 36 to the carriage 24 to carry out wash program steps in a controlled and sequential fashion as those steps are retrieved from memory in conventional fashion. The wash program may be simple and universal as to all customers or may offer extra cost optional features such as wax application, blow-drying, rustproofing, etc.

It is to be understood that while a "coin receiver" has been described as providing the initiating input on line 34 to controllers 32, an initiation or system activation signal may also come from a variety of other sources including a keyboard, a token receiver, an electric eye, and/or an instrumentality which is under the control of an attendant.

Finally, the system of FIG. 1 is provided with a sign 38 which receives signals provided by controller 32 on output line 40 to illuminate in such a way as to provide any or all of several messages including "stop", and "exit". The sign 38 is positioned where it may be seen at all relevant times by the driver of the vehicle 28. The size and position represented in FIG. 1 is an example only and may vary from one application to another.

Looking now at FIGS. 2-4, additional details of the carriage 24 and the structure associated therewith will be given.

Figure 2:
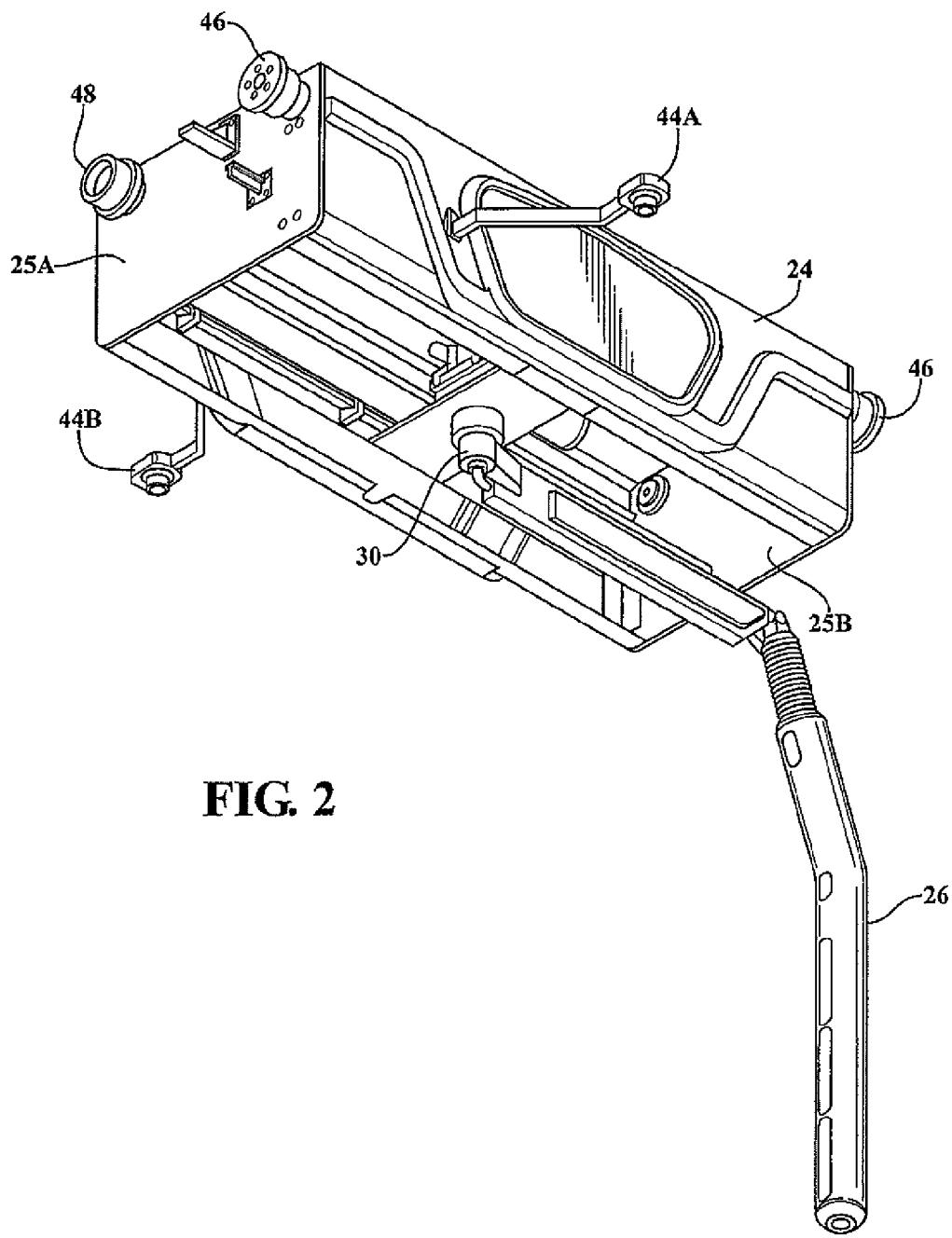
FIG. 2 is a perspective view of a carriage having a single depending spray arm in the system of FIG. 1.

As shown in FIG. 2, the carriage 24 may comprise end plates 25A, 25B joined by struts and sheet metal plastic covers to provide an aesthetically pleasing appearance. FIG. 2 also illustrates the fact that the carriage 24 is provided with two down-looking sonar-type sensors 44A, 44B of which sensor 44A is mounted on an arm extending from the carriage 24 toward the vehicle entry point while sensor 44 is mounted on an arm extending toward the exit 42. These sensors, together with control computer 32, are capable of "finding" the front and rear ends of any vehicle 28 parked in the bay so as to provide information which determines the length of the longitudinal travel of carriage 24 during a washing operation thereby to avoid wasteful motion and over travel of the carriage 24, especially relative to the rear of a particularly short vehicle in the bay 12. Finding and noting in memory the location of the ends of the vehicle 28 also prevents inadvertent contact between the spray arm 26 and the vehicle 28 as it moves around the vehicle during the steps of a wash/rinse sequence. A vehicle boundary finding system is more fully described in Reissue Patent RE 40,463 assigned to Belanger, Inc., the disclosure of which is incorporated herein by reference.

Figure 3:
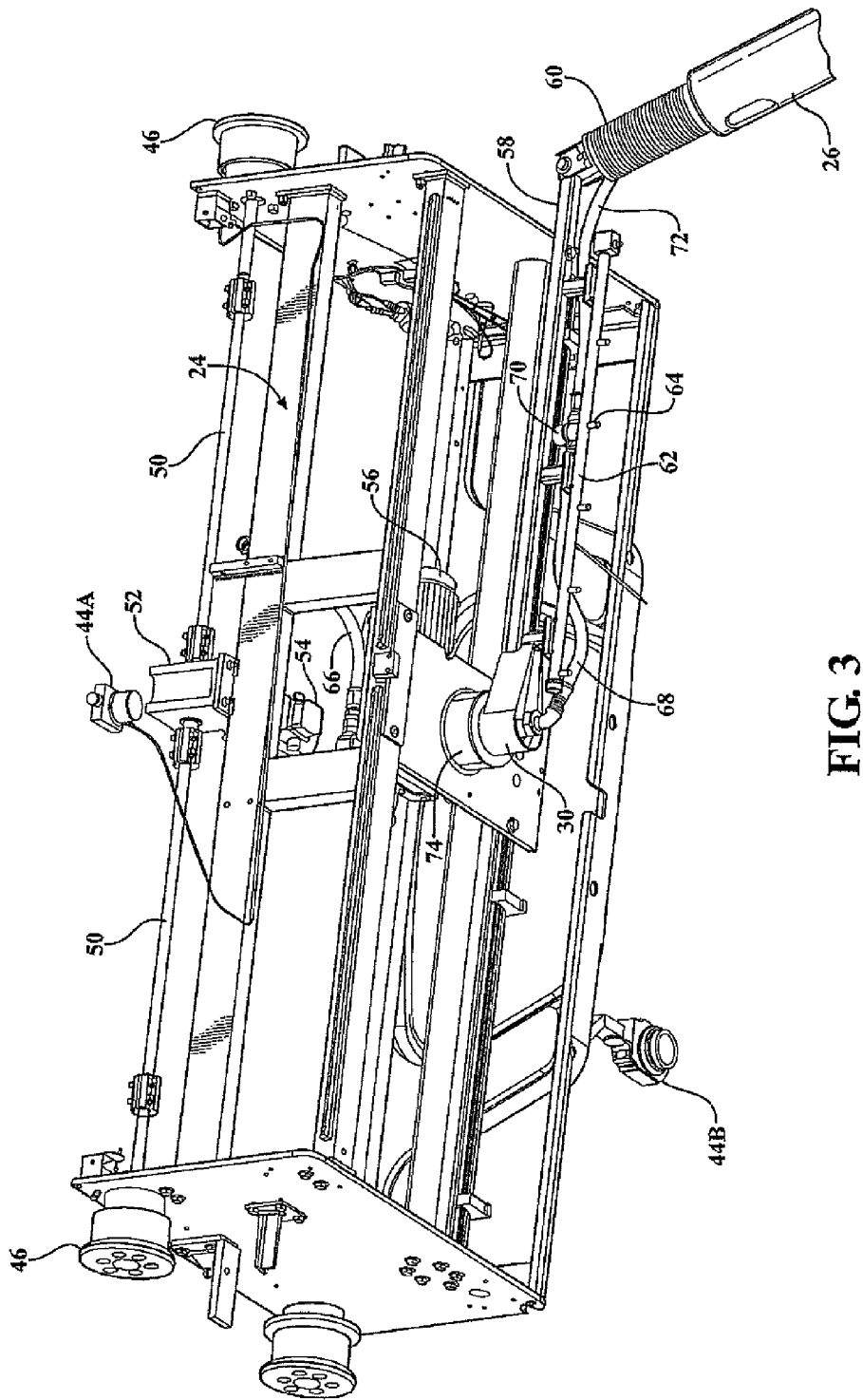
FIG. 3 is a detailed drawing of the carriage and arm structure of FIG. 2 but with the cover of the carriage removed to reveal internal components.
Figure 4:
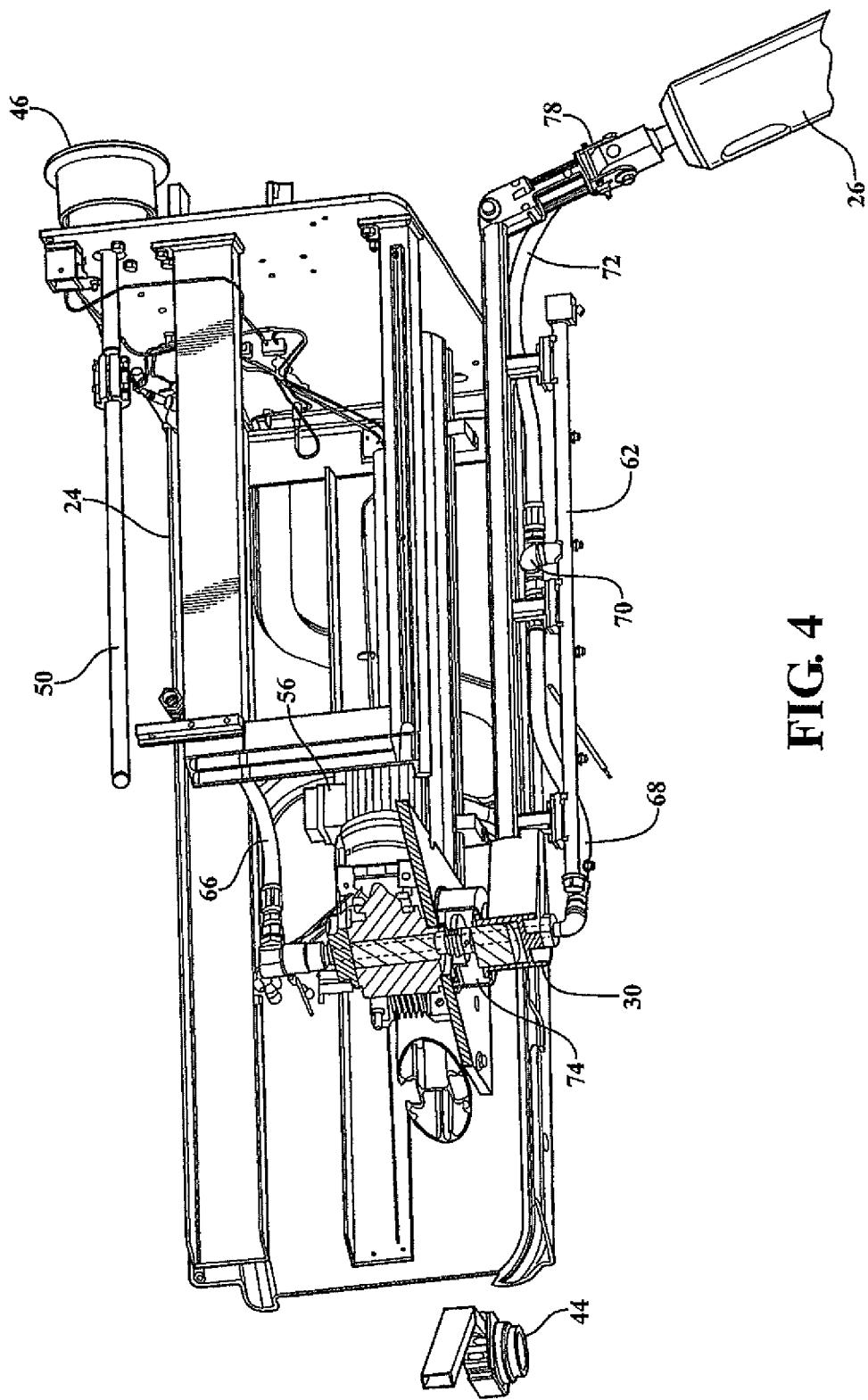
FIG. 4 is another perspective view of the carriage and arm structure of FIG. 3 with parts of the rotary pivot for the arm broken away to show how fluid and electrical power are supplied to the arm.

As also shown in FIGS. 2-4, the carriage 24 is provided with drive wheels 46 on the opposite side plates 25A, 25B which drive wheels rest on the rails 20, 22 of the overhead railway and provide traction for longitudinal motion over the railway. Additional idler wheels 48 are also provided on the carriage 24 for stabilization purposes.

Looking now to FIGS. 3 and 4, it can be seen that drive shafts 50 are connected between the drive wheels 46 and a gear box 52 which is mounted on a pedestal on the center of the carriage 24 along with an electric motor 54 which is operatively connected to the gear box 52. The motor is reversible so that the carriage can be caused to travel in a programmed fashion and to a programmed degree in both forward and reverse longitudinal directions along the railway 20, 22 as hereinafter described.

A second motor/gear box combination 56 is also mounted on the carriage 24, in this case to cause rotation of the arm 26 as well as the upper horizontal arm 58 by way of which the arm 26 is connected to the pivot structure 30. A boot 60 wraps around the upper end of the arm 26 where it joins the horizontal arm portion 58 and contains a four-way breakaway knuckle hereinafter described in greater detail. As stated above, there is no lateral movement capability for pivot 30 or any part of carriage 24. Details of the knuckle are given in the co-pending application Ser. No. 13/025,466 filed concurrently herewith, and the contents of that application are incorporated here by reference.

The arm 26 carries nozzles along its length as well as a horizontal manifold 62 which is equipped with a series of spaced-apart spray nozzles 64 to direct washing and rinsing fluids toward the top or horizontal surfaces of a vehicle 28 in the bay. The nozzles spaced along the length of arm 26 direct fluids outwardly toward the side, front and rear surfaces of the vehicle 28 during a washing and rinsing operation, suitable apertures being provided in the side of the plastic sleeve covering arm 26 as hereinafter described.

Fluids are supplied to the carriage structure by way of an input hose 66 which is coupled to a boom extending outwardly from a wall of the bay as described above. Hose 66 is coupled to a conduit which runs through the center of the pivot 30 by way of a rotatable fluid coupling in fluid communication with a supply conduit 68 which is connected to a T fitting 70 which supplies the fluid not only to the manifold 62 and nozzles 64 but also by way of flexible conduit 72 to a supply pipe running down the center of the arm 26 and connected to the various spray nozzles in the arm 26 as shown in FIGS. 5 and 6.

As is more fully described in the co-pending application Ser. No. 13/025,466, filed concurrently herewith, the carriage 24 is provided with an AC power source which may, for example, consist of wires and/or cables from an off-board power supply, and a six-channel slip ring assembly 74 which provides electrical service from the wires or cables on the carriage 24 to the electrical devices, if any, carried by the arm 26. The slip ring assembly 74 allows the arm 26 to travel around the vehicles, such as 28, in one direction only without causing a "wind-up" problem and requiring full alternating reversals of travel direction. A full-course carwash can require as many as eight circumnavigations of the vehicle; to accommodate this with loose wiring would cause unacceptable "wind-up". In this case, the electrical devices carried by the arm 26 may include LEDs as well as sensors or limit switches associated with the four-way breakaway knuckle to provide signals to control computer 32 to indicate that the arm 26 has been displaced away from its normal operating orientation.

FIG. 4 also shows the carriage with the cover removed and provides a better illustration of the T-fitting 70, the slip ring structure 74 and the four-way breakaway knuckle 78. The knuckle 78 includes two orthogonally operative breakaway joints characterized by spring-loaded ball detents riding on semi-circular surfaces with center receptacles.

Figure 5:
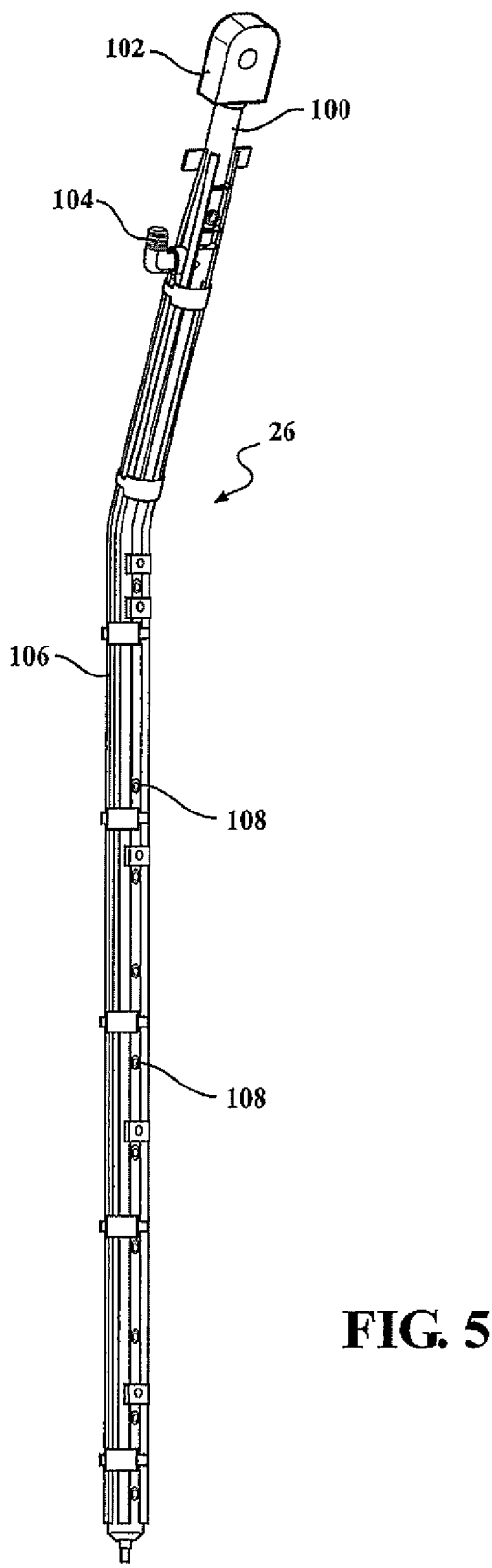
FIG. 5 is a perspective view of a spray arm from the apparatus of FIGS. 1-4 with the outer sleeve removed.
Figure 6:
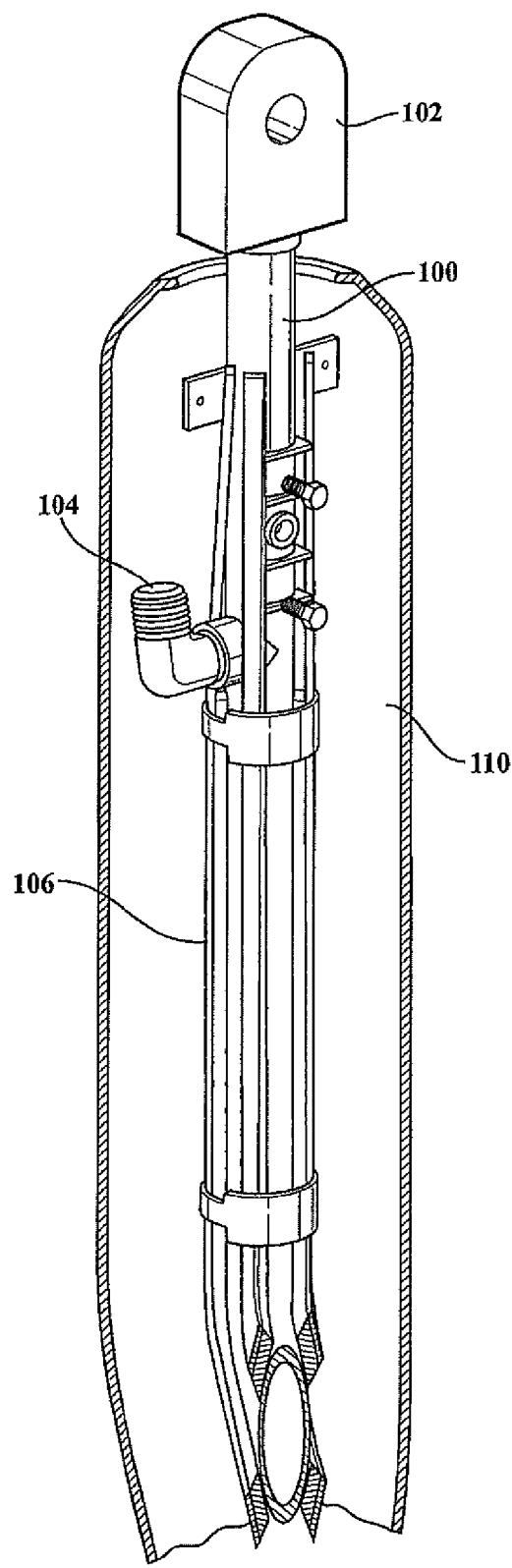
FIG. 6 is a cutaway perspective view of a detail of the arm of FIG. 5.

Referring to FIGS. 5 and 6, the arm 26 is shown to comprise a metal pipe 100 which is connected at the upper end to the detent block 102 forming part of the knuckle 78. A fluid supply fitting 104 is connected as a T-fitting into the conduit 100 to supply fluid to nozzles 108 located along the center pipe 100. LED strips 106 run down the sides of the internal structure of the arm as shown in this figures and are capable of being activated in red, green, blue colors as well as combinations thereof to provide both constant or intermittent "flashing" lighting effects. The structure just described is surrounded by an 8" diameter plastic sleeve 110 which is preferably a translucent milky or neutral colored casting of polyethylene with enough EVA or other elastomer mixed into it to make the material resilient and, as a consequence, tolerant of occasional inadvertent contact with, for example, a vehicle bumper or side view mirror without damage or denting. The EVA/alloyed polyethylene transmits light from the LEDs on the strips 106 efficiently and also diffuses the light from the LEDs so as to create a fuller, more aesthetically pleasing lighting effect. It is to be noted, however, that the spray arm 26 may be illuminated by lighting systems other than RGB LEDs as well as lights which are different in physical characteristic and/or are mounted externally of the arm as will be apparent to persons skilled in the lighting arts. The internal illumination of the arm 26 under the control of computer 32 is preferred for reasons hereinafter described with reference to the flowchart of FIG. 7.

Figure 7:
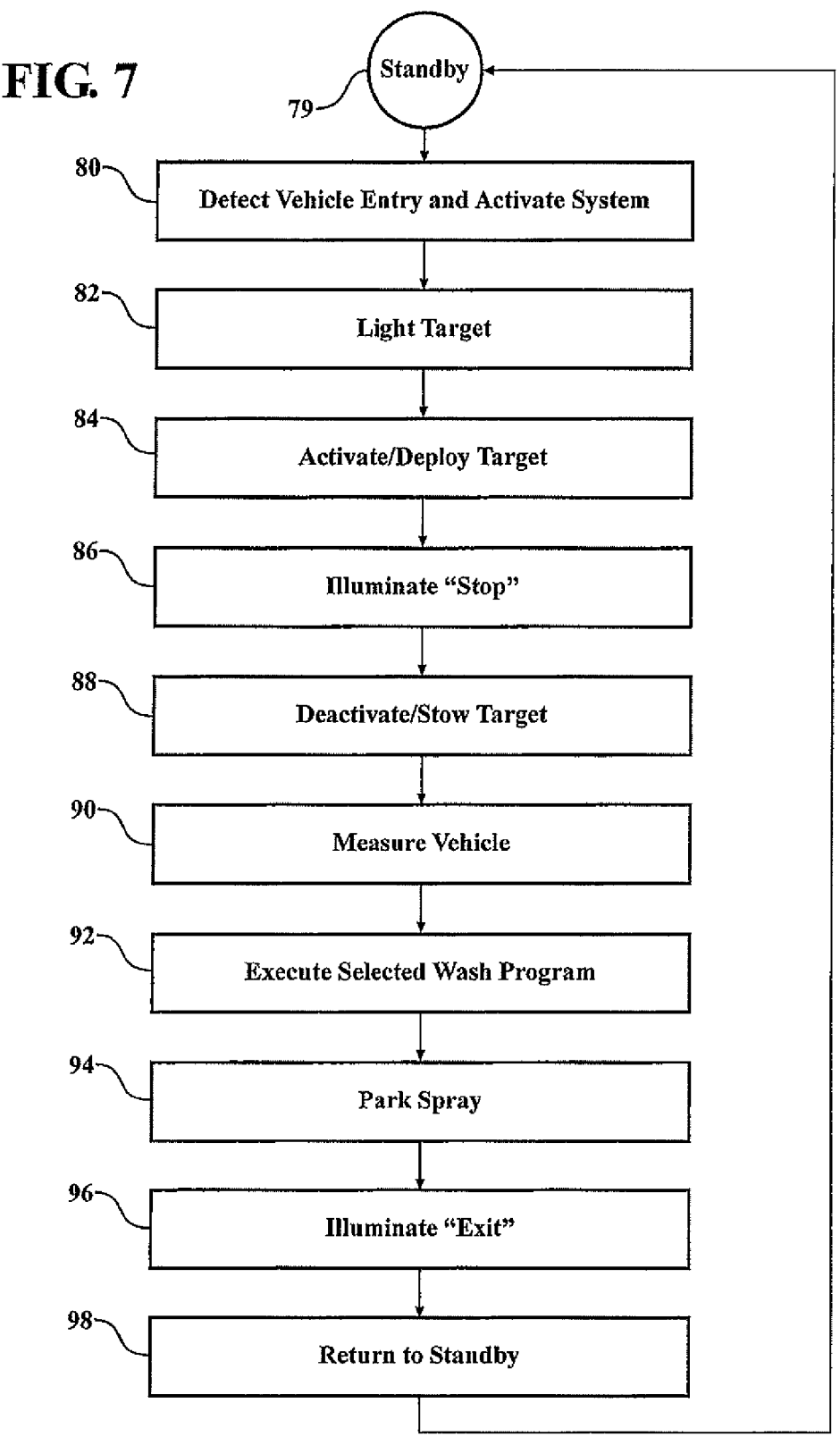
FIG. 7 is a flow chart of the steps which may be performed in the operation of the apparatus of FIGS. 1-6.

Referring now to FIG. 7, a method of operating the systems thus far described will be explained in detail.

Under normal circumstances, the system 10 of FIG. 1 is in a "standby" condition as illustrated by circle 79 in FIG. 7. In this condition, no fluids are being dispensed and only a minimum amount of electrical energy is being consumed by the various components of the system described above. When the vehicle 28 approaches and/or enters the bay 12, a signal is sent by one of the available devices connected to line 34 to the control computer 32 to cause the system to exit the standby condition 79 and enter an activated condition represented by block 80 in FIG. 7. At this point, power is made available to the motors 54, 56, the sensors 44 and any other sensors that might be associated with the knuckle 78.

The system then progresses under the control of the computer 32 to position or activate a "target" identifying the centerline 14, in this case by illuminating the arm 26 by way of the green LEDs 106 within the envelope or sleeve 110 and causing them to flash. A different arrangement might be used with a different type of target, as hereinafter explained. The control computer 32 then moves to flowchart block 84 to activate and/or deploy the target. In this case, deployment means that the arm 26 is moved from the parked position at the far right hand corner of the bay 14 to the centered or target position shown in FIG. 1 over centerline 14. This is carried out by activating the motor 56 to rotate the arm 26 by way of the pivot 30 and, as necessary, to move the carriage 24 longitudinally to the desired position. That desired position is normally at the far exit and extreme of longitudinal travel but may be nearer at the entry end if a "rabbit" function is provided whereby the driver of the vehicle actually follows the target down the centerline 14 until the target arm 26 comes to a stop. An electric eye set including sender 15 and receiver 17 may be used for this purpose.

As shown in flowchart block 86, when the vehicle 28 achieves the desired position, the control computer 32 illuminates the stop sign 38 to tell the driver that he or she has placed the vehicle 28 in the proper position. Sensing the desired position can be carried out by way of the sensors 44, or by contact wands or electric eyes (not shown) arranged to look across the bay at a point where the system wants the front end of the vehicle 28 to be placed during the subsequent washing and rinsing operations.

Block 90 shows the function of measuring the vehicle by way of the sensors 44 so as to define the extent of longitudinal travel which will be needed during the washing and rinsing steps. A shorter vehicle is best washed with less longitudinal travel so that the spray is close enough to the vehicle to produce the desired effects.

The system under the control of computer 32 progresses to the wash program represented by block 92. This program may involve several circuits of the arm 26 around the vehicle during which circuits pre-wash and wash fluids are sprayed under pressure onto the exterior surfaces of the vehicle 28. This is followed by a rinsing function and any other elected functions such as the dispensing of rustproofing chemicals and/or waxes, as well as blow-drying. Examples of other chemicals which might be dispensed selectively at this time will be apparent to persons knowledgeable in commercial car wash operations; e.g., non-spotting rinse chemicals.

A substantial advantage of the inverted L-shaped spray arm system shown and described herein is the fact that the spray nozzles are directed at a vehicle surface at all times; i.e., the location of the pivot point on the interior end of the arm; i.e., the end of the horizontal leg of the "L" and the unidirectional rotation means the spray system wastes little fluid spraying it into empty space.

Figure 8:
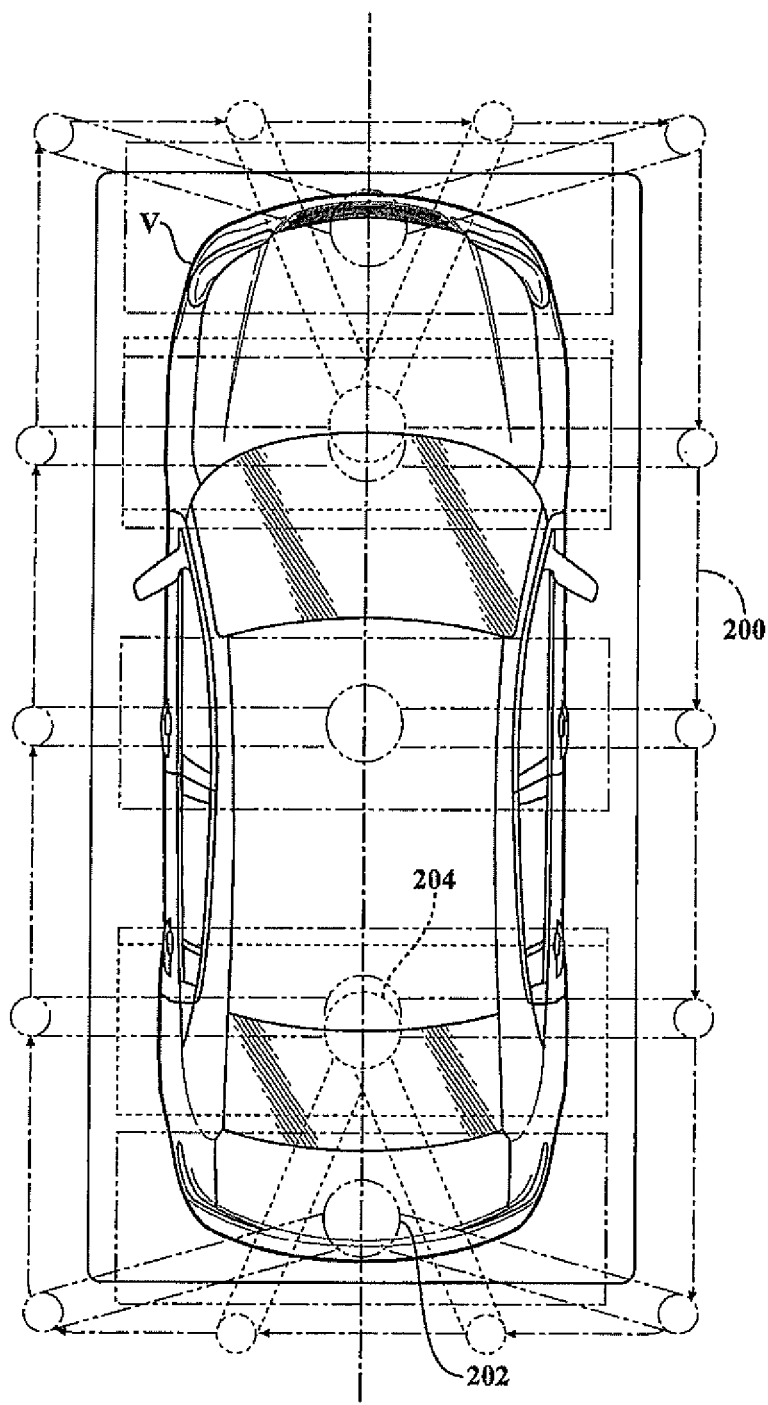
FIG. 8 is a diagram of a pattern of travel of a spray arm during circumnavigation of a vehicle parked in a wash bay.

FIG. 8 shows in plan view how the longitudinal and rotational movements of the spray arm 26 can be coordinated to wash an entire vehicle, generating a substantially rectangular path 200 of arm travel while maintaining a substantially constant distance between the spray arm and the vehicle even though no lateral carriage movement is available. The program may start, for example, in the upper right corner of FIG. 8, progress down the passenger (right) side of the vehicle V, and then, by coordinating forward carriage movement; i.e., movement of the center of rotation toward the center of the vehicle; i.e., from 202 to 204, with clockwise arm rotation, maintain a reasonably constant distance from the nozzles to the vehicle. The arm then progresses across the rear of the vehicle. Travel up the driver's side of the vehicle is achieved by pure longitudinal carriage travel, but turning the corner requires longitudinal movement of the center of rotation away from the center of the vehicle. Movement across the front of the vehicle mirrors the coordinated movement across the rear. The arm can continue to rotate clockwise without reversals unless needed for short term remedial purposes such as to back away from inadvertent contact with an out-of-position vehicle. As stated above, the downward spray is always directed toward a vehicle surface.

It will be appreciated that the embodiments illustrated in the drawing and described above are exemplary and that implementation of the invention can be carried out in various other configurations. For example, while a multiple circuit slip ring connector is preferred for the rotation-tolerant electrical connection between carriage 24 and arm 26, non-contacting devices based on capacitive, inductive and RF power transmission can also be substituted as functional equivalents.

What is claimed is:

1. A method of operating a carwash system of the type including an overhead carriage dependingly supporting an elongate, generally vertical spray arm comprising a fluid conduit with fluid dispensing nozzles thereon, an illumination system including lights arranged along the length of the arm, and an elongate translucent sleeve enclosing the conduit and the illumination system, the carriage carrying separate first and second motors for causing longitudinal movement of the carriage relative to the wash area as well as rotational movement of the arm about a generally vertical pivot axis comprising the steps of:

(a) delivering electrical power to the lights through a slip ring assembly mounted between the carriage and the arm to illuminate the arm along its vertical length; and (b) causing the arm to essentially unidirectionally circumnavigate vehicles in the wash area while performing one or more wash functions.

2. A touchless automatic car wash system for vehicles in a wash area comprising:

an overhead carriage;

a spray arm having a vertical axis and depending along said axis from the carriage into the wash area;

a system for driving the spray arm in a path at least partially circumnavigating a vehicle in the wash area;

said spray arm including an illumination circuit having lights vertically arranged along the vertical length of said arm for emitting illumination visible to a driver of a vehicle in the wash area; and a slip ring electrical connector between said carriage and said arm for carrying electrical power to the illumination circuit wherein the spray arm includes a fluid conduit and a hollow, translucent sleeve surrounding and enclosing said conduit, said lights being disposed internally of said sleeve such that the illumination is visible through and along substantial portions of said sleeve.

3. The method as defined in claim 1 wherein the illumination system includes at least one strip of serial-connected LEDs.

4. The method as defined in claim 1 wherein the slip ring assembly has multiple circuits and the illumination system has multiple strips of serial-connected LEDs wherein each strip is connected to a power source through an individual slip ring conduit.

* * * * *